R. S. SMITH.
ELECTRIC ARC WELDING MACHINE.
APPLICATION FILED MAY 17, 1920.
1,347,184.
Patented July 20, 1920.
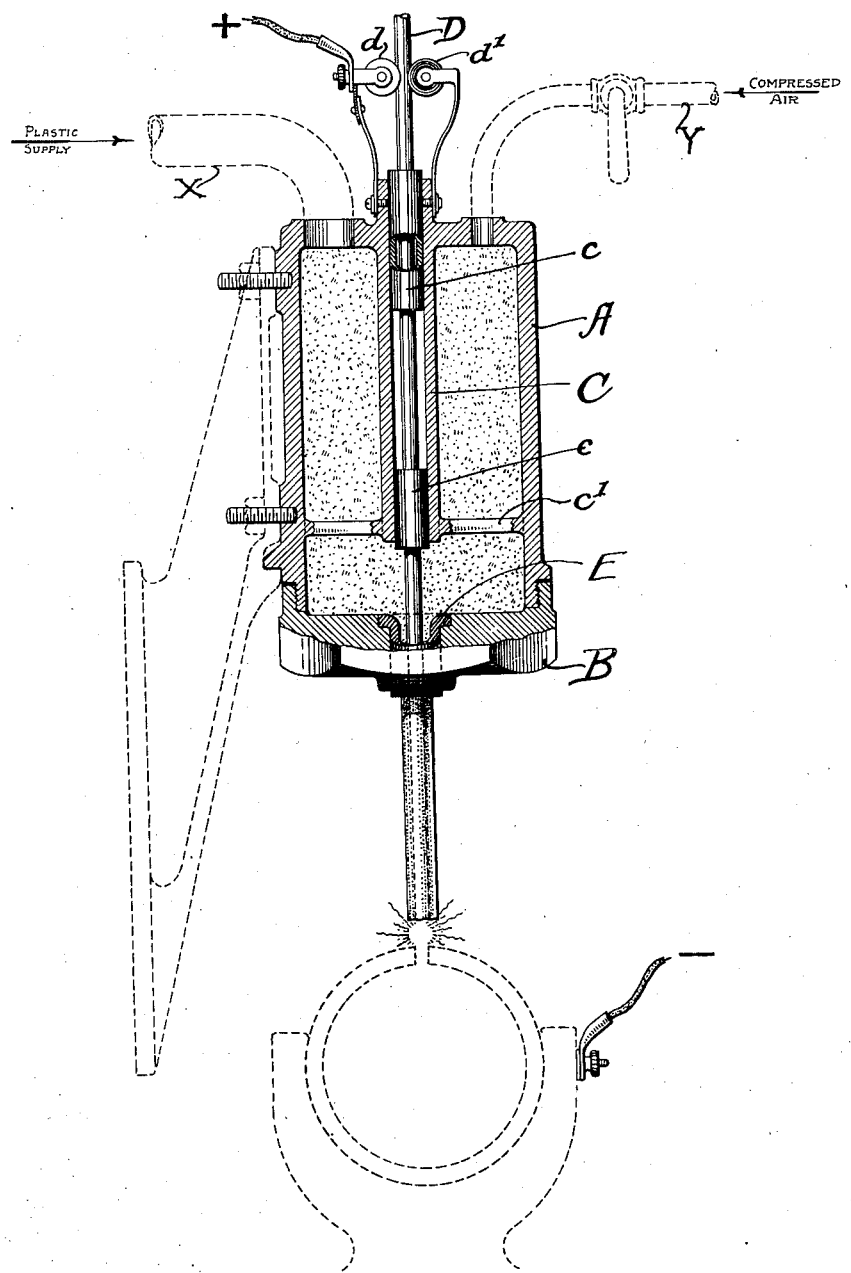
INVENTOR
R. Stanley Smith.
WITNESS
BY
Erwin, Wheeler & Woolard.
ATTORNEYS

UNITED STATES PATENT OFFICE.

REUBEN STANLEY SMITH, OF MILWAUKEE, WISCONSIN.

ELECTRIC-ARC-WELDING MACHINE.

1,347,184.

Specification of Letters Patent.　Patented July 20, 1920.

Application filed May 17, 1920.　Serial No. 381,877.

*To all whom it may concern:*

Be it known that I, REUBEN STANLEY SMITH, a citizen of the United States, residing in the city of Milwaukee, county of Milwaukee, in the State of Wisconsin, have invented certain new and useful Improvements in Electric-Arc-Welding Machines, (Case No. 158;) and I do declare the following to be a clear, complete, and exact description thereof, such as will enable persons skilled in the art to which my invention pertains to make and use the same, reference being had to the accompanying drawing for an illustration of one form in which the invention has been embodied.

My invention relates to arc welding machines, in which a fusible or destructible covered metallic electrode is employed; to such electrode; and to the means for covering the electrode.

In the process of arc welding in which fusible electrodes are employed to conduct the welding current to the work, and supply additional substance to the welded joint, it has been demonstrated that the best results are attained by the employment of covered electrodes. The point of the metallic electrode fuses quite freely under the intense heat generated by the electric arc, and the covering for such electrode is usually constituted of some material which is comparatively slow in combustion, so that a crater is formed by the said covering just a little in advance of the fusing point of the electrode. The presence of the crater serves to eject the molten metal flowing from the fusing electrode, directly upon the welding line, and in this manner contributes to a concentration of the molten metal upon the joint in the work, the temperature of the latter having been raised to a welding degree by the passage of the electric current. The disintegration of the covering of the fusible electrode under the influence of the heat generated by the electric arc follows quite closely the fusing of the electrode, so that the destruction of the electrode and its covering are in the same ratio, although the disintegration of the said covering is slightly retarded with relation to the consumption of the electrode.

Means have been perfected whereby the consumption of the fusible electrode bears a definite relation to the rate of formation of the welded joint. In other words, as the operation of welding progresses, the fusible electrode is automatically fed to the welding line, and is consumed in the rate of the progression of the welding operation, and a uniform welding current is maintained. The perfection of the means referred to for equalizing the ratio of consumption of the fusible electrode and the progress of the operation of welding, has advanced the art of welding with fusible electrodes to a point where it is desirable that the short lengths of covered electrodes previously used, be replaced by electrodes of great length, and which are now characterized as continuous, so that there may be no interruption of the welding operation to replenish the electrode material. Such continuous electrode may be in the form of a metallic rod of exceeding length, or it may be a wire carried upon a reel. The use of such continuous electrodes has led to some changes in the manner of applying the covering thereto. Instead of applying the covering to the electrode before the latter is placed in position in the welding machine, as heretofore, it has been found practicable to apply such covering to the electrode at a point some distance in the rear of the fusing point of the electrode, and while the latter is being consumed in the welding operation.

My present invention relates to a process and apparatus for coating the electrode with a suitable covering of plastic material which is applied to the electrode during the fusing or feeding movement of the latter, such application of the covering material to the electrode being made at a point some distance in the rear of the fusing end of the electrode.

In carrying out my present invention I provide a stuff-chest which contains a supply of plastic material, which latter by reason of its plastic state may be caused to flow and be compressed about the electrode, so as to form a homogeneous coating or covering thereon. By means of air pressure, the supply of plastic material is caused to flow from the stuff-chest at a rate which is equal to that of the movement of the electrode through the stuff-chest, so that a coating or covering of uniform density is evenly applied to the electrode. The plastic compound will be of such nature and consistency as will cause it to cohere firmly about the electrode and maintain the formation induced by the pressure exerted upon the coating or covering material at the point of its application to the electrode. The point of such application is, as hereinbefore stated, slightly in the rear of the fusing end of the electrode, and the heat generated by the arc at the fusing point will act to expel the moisture from the plastic covering soon after the covered electrode emerges from the stuff-chest.

The invention also relates to a novel construction of covered electrode, in that a metallic electrode provided with a homogeneous coating or covering compactly molded thereon, is produced.

Having thus outlined the nature of my present invention, I will now proceed to specifically describe the same in connection with the accompanying drawing, which shows an electric welding machine as provided with the stuff-chest referred to, the said chest being shown in vertical section, and illustrating in a clear manner the operation of my invention. Automatic welding machines are now so well known, and their operation is so generally understood, that I deem it unnecessary to make more than a conventional showing of the parts of such machine.

In the drawing, the welding machine is shown as supporting a tube, rolled from a flat blank, and as in position to have the meeting edges thereof fused and united in an arc welding operation. The progress of the operation of welding and the relative movement of the fusible electrode along the welding line are, as hereinbefore stated, in the same ratio. The bracket shown in dotted outline in the drawing and attached to the frame of the welding machine, supports a hollow stuff-chest A, which may be provided with a closure cap B. It is preferred to construct the stuff-chest as a cylinder, and to provide such cylinder with a central tubular guide C, attached to the base of the chest, which in the illustration shown is the upper end thereof. Insulating bushings $c$ are placed within the central bore of the guide C, and direct the electrode in its passage through the stuff-chest. The guide C terminates at a point some distance inside of the mouth or lower end of the chest, and such guide C may be stayed by a spider $c'$ extending from the said guide to the side walls of the chest, and through the openings in which spider the plastic material may have a free and unobstructed movement.

The fusible electrode may be embodied in a metal rod of great length, or it may be a wire carried upon a reel, and will be positively fed to the welding line in the ratio of the consumption of the electrode and the progress of the welding operation, the electrode in its movement being guided through the bushings $c$, before referred to.

The stuff-chest is filled with a plastic compound which is supplied under pressure, and to retain such pressure the pipe X, through which the said compound is supplied to the stuff-chest, may be provided with a check valve to prevent back flow. I have shown a compressed air pipe Y, as leading to the stuff-chest, the pressure of the air thus supplied being sufficient to force the plastic compound through an orifice in the cap B at the lower end of the chest. The said orifice is bushed by a trumpet E, by means of which the plastic coating or covering is compacted about the electrode by the air pressure, as the electrode moves through the stuff-chest. The throat of the trumpet will be of such size as to permit the formation of a coating or covering of the desired thickness to be applied to the electrode, and the relative size thereof will be determined by the material of which the electrode is constituted, and the nature of the welding operation to be performed. An electrode possessing the novel structural characteristics above described, is embodied in my present invention.

The plastic compound employed for the purpose of coating or covering the electrode may be composed of any materials suitable for the attainment of the desired result. I have found that a compound of clay and paper pulp or other cellulose fiber in suitable proportions, is well adapted for the purpose, the elements of the compound cohering sufficiently to permit the formation of the desired coating or covering. The clay contained in the mixture will be so proportioned as to retard the burning of the covering to the desired degree, while the paper pulp in the mixture will permit the disintegration of the covering at the proper time, following closely the fusion of the electrode. The heat generated by the arc will dispel the moisture of the compound so that the coating or covering is present at the fusing end of the electrode in a baked or hardened condition, which condition preserves the crater until disintegration of the cover takes place. The electric current will be supplied to the electrode at an exposed point outside of the stuff-chest, and the contact with the electrode may be made by a brush or roller $d$, carried upon an insulated bearing. A complemental brush or roller $d'$, formed of insulating material, may bear upon the opposite side of the electrode, if desired.

As before stated, back flow of the plastic compound will be prevented by a suitable check valve in the supply pipe X, and the application of the air pressure to the plastic compound will cause the latter to flow through the trumpet E, by means of which the plastic material will be compressed into a homogeneous coating or covering around the electrode, as the latter emerges from the stuff-chest. The means which I have devised enable me to provide a continuous supply of covering material for the electrode, and greatly facilitates the welding operation, in that a covered electrode of continuous form may be used, without the interruptions incident to the former practice of welding with fusible electrodes of short length, so that the output of the welding machine using such continuous electrode will be materially increased.

Having thus described my invention, what I claim and desire to secure by Letters Patent of the United States, is:—

1. In an arc welding machine employing a fusible metallic electrode, connections for supplying a fusing current to the electrode, and means for applying a plastic coating or covering to the electrode as the latter is fed to the work to be welded and consumed in the welding operation.

2. In an arc welding machine employing a fusible metallic electrode, connections for supplying a fusing current to the electrode, a container for plastic material, and means for applying a coating or covering of said plastic material to the electrode as the latter is fed to the work to be welded and consumed in the welding operation.

3. In an arc welding machine employing a fusible metallic electrode, connections for supplying a fusing current to the electrode, a stuff-chest for holding a supply of plastic material, and means for applying a coating or covering of said plastic material to the electrode as the latter is fed to the work to be welded and consumed in the welding operation.

4. In an arc welding machine employing a fusible metallic electrode, connections for supplying a fusing current to the electrode, a stuff-chest for holding a supply of plastic material and provided with guides for directing the passage of the electrode, and means applying a coating or covering of said plastic material to the electrode as the latter passes through the stuff-chest and is fed to the work to be welded and consumed in the welding operation.

5. In an arc welding machine employing a fusible metallic electrode, connections for supplying a fusing current to the electrode, a container for holding a supply of plastic material, and air-pressure means for applying a plastic coating or covering to the electrode as the latter is fed to the work to be welded and consumed in the welding operation.

6. In an arc welding machine employing a fusible metallic electrode, connections for supplying a fusing current to the electrode, a stuff-chest for holding a supply of plastic material and provided with an outlet through which the electrode passes, means for forcing the plastic material through the said outlet to form a coating or covering for the electrode as the latter is fed to the work to be welded and consumed in the welding operation.

7. In an arc welding machine employing a fusible metallic electrode, connections for supplying a fusing current to the electrode, a stuff-chest for holding a supply of plastic material and provided with an outlet through which the electrode passes, air-pressure means for forcing the plastic material through the said outlet to form a coating or covering for the electrode as the latter is fed to the work to be welded and consumed in the welding operation.

8. In an arc welding machine employing a fusible metallic electrode, connections for supplying a fusing current to the electrode, a stuff-chest for holding a supply of plastic material and having a restricted outlet through which the electrode passes in its feeding movement to the welding line, and means for applying a coating or covering of the plastic material to the electrode while the latter is passing through the said outlet, whereby the said coating or covering is compacted about the metallic electrode.

9. In an arc welding machine employing a fusible metallic electrode, connections for supplying a fusing current to the electrode, a stuff-chest for holding a supply of plastic material and having a restricted outlet through which the electrode passes in its feeding movement to the welding line, and air-pressure means for applying a coating or covering of the plastic material to the electrode while the latter is passing through the said outlet, whereby the said coating or covering is compacted about the metallic electrode.

10. The method of arc welding, which consists in bringing into proximity the edges of the work to be welded, conducting an electric current thereto by means of a fusible metallic electrode, feeding the electrode to the work in the ratio of the consumption of the electrode, and applying a plastic coating or covering to the electrode during the feeding and fusion thereof.

11. An electrode for use in electric arc welding, such electrode comprising a fusible metallic wire or rod and provided with a homogeneous coating or covering formed and impacted thereon.

12. An electrode for use in electric arc welding, such electrode comprising a fusible metallic wire or rod and provided with a homogeneous coating or covering of compounded clay and pulp suitably proportioned compressed thereon.

In testimony whereof I have signed my name at Milwaukee this 14th day of May, 1920.

R. STANLEY SMITH.

Witnesses:
W. F. WOOLARD,
MARGARET C. WOOLARD.